United States Patent [19]

Carroll et al.

[11] 4,272,643
[45] Jun. 9, 1981

[54] FIRE RESISTANT FITTING

[75] Inventors: James C. Carroll, Hamilton, Ohio; Donald L. Chapman, Liberty, Ind.; Stephen L. Flee, Oxford; Gilbert A. McGoldrick, Hamilton, both of Ohio

[73] Assignee: Square D Company, Palatine, Ill.

[21] Appl. No.: 961,075

[22] Filed: Nov. 15, 1978

[51] Int. Cl.³ .............................................. H02G 15/04
[52] U.S. Cl. ...................................... 174/48; 52/221; 52/232
[58] Field of Search ................... 52/232, 221, 1; 49/1; 174/48, 77, 49, 152 G; 169/56

[56] References Cited

U.S. PATENT DOCUMENTS

| | | | |
|---|---|---|---|
| 1,851,939 | 3/1932 | Williams | 138/89 |
| 1,851,940 | 3/1932 | Williams | 174/152 G |
| 3,655,907 | 4/1972 | Philibert | 138/89 |
| 3,965,629 | 6/1976 | Pearsons | 52/704 |
| 4,061,344 | 12/1977 | Bradley | 52/232 |
| 4,091,231 | 5/1978 | Sotolongo | 174/48 |

*Primary Examiner*—John E. Murtagh
*Attorney, Agent, or Firm*—Larry I. Golden; Norton Lesser; Richard T. Guttman

[57] ABSTRACT

A fire resistant fitting including a pair of plates having a fire rated expandable material therebetween and a pair of conduits extending from each plate with one conduit of each pair in alignment with a respective conduit of the other pair and a respective passage in the expandable material to extend separate power and communication connections through a floor. Threaded members extend from one plate through the other plate for squeezing the expandable material against the sides of the floor opening in which the fitting is located and stops on the threaded members prevent the application of excessive force to the material.

10 Claims, 4 Drawing Figures

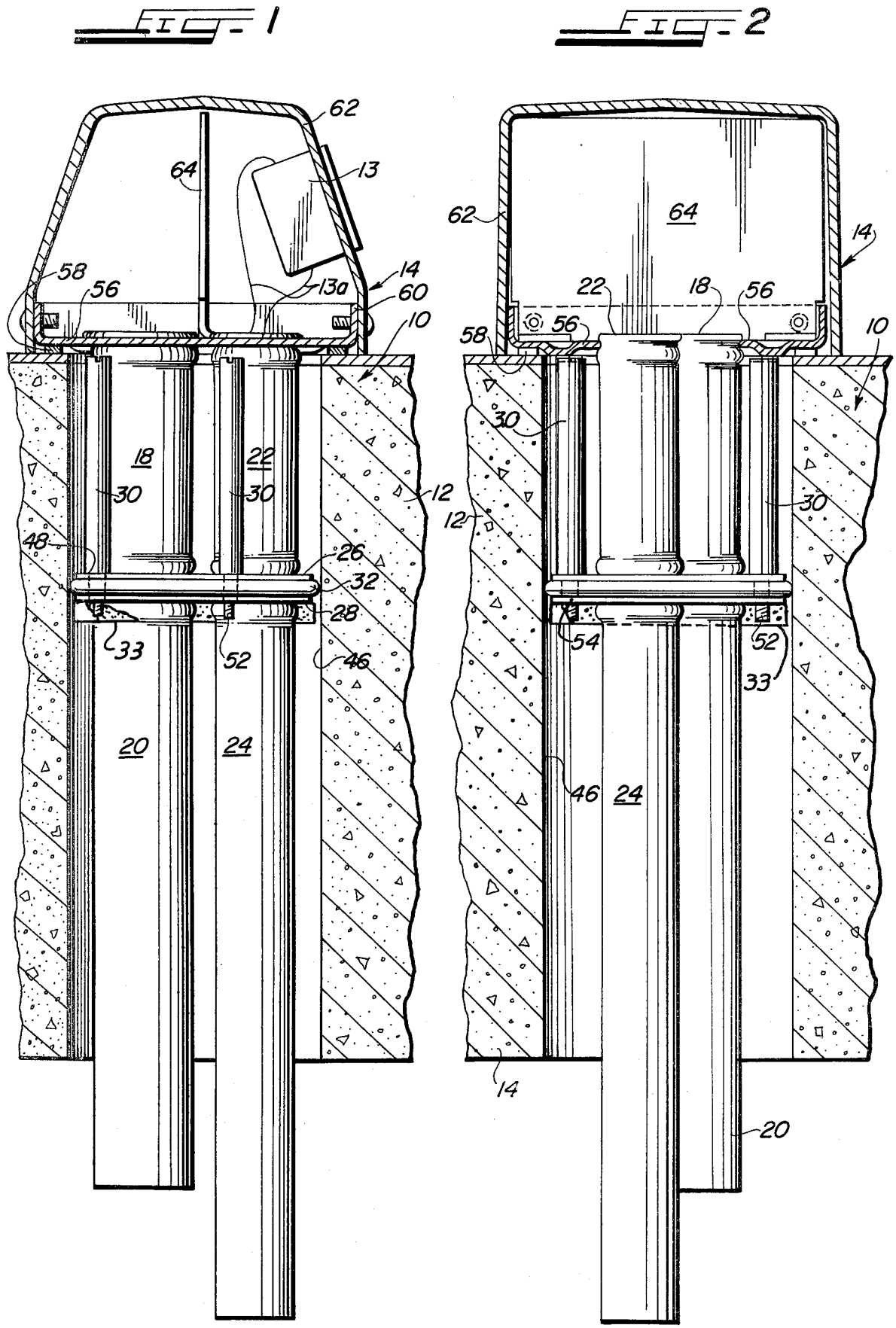

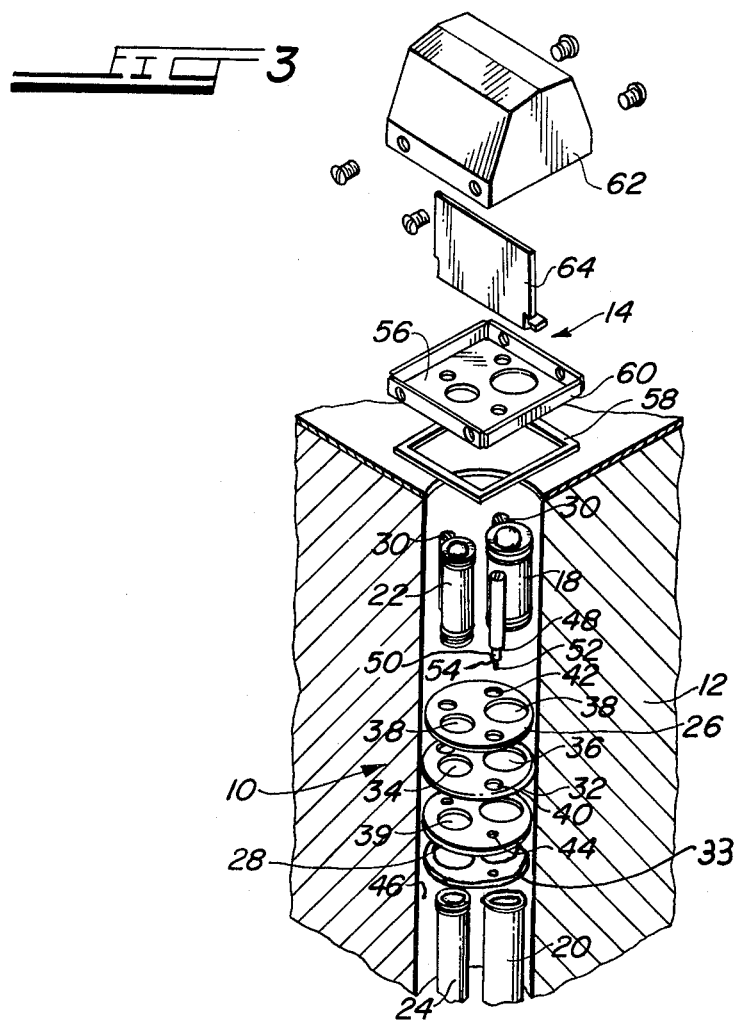
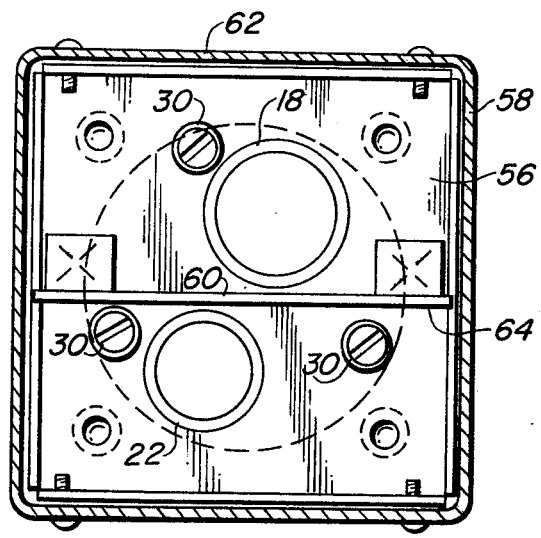

FIRE RESISTANT FITTING

BACKGROUND OF THE INVENTION

1. Field of the Invention

This invention relates in general to fire resistant fittings for extending electrical connections and, more particularly, to an improved and more economical fire resistant fitting assembly for extending power and communication lines in separate passages through a floor.

2. Summary of the Prior Art

Prior art arrangements providing separate passages for extending power and communication lines through a floor while sealing the floor opening against the passage of heated or combustion air incorporate an intumescent material in a relatively complicated or expensive housing assembly. Such assemblies are typified by U.S. Pat. Nos. 3,995,102 and 3,864,883 and are required to define the separate passages and/or suspend or mount the assembly and the intumescent material in the floor opening in a position to seal the periphery of the opening or the separate passages.

SUMMARY OF THE PRESENT INVENTION

The present invention incorporates a simple and unique concept in a fitting assembly for extending separate passages through a floor opening while providing fire resistant expandable sealing means for closing the passages and the opening in the event of fire or a like condition. The fitting assembly incorporates two plates, each having a pair of standard conduits extending in opposite directions therefrom to form respective power and communication passages and a conduction or fire barrier material located between the plates and having passages in communication with each conduit for providing separate passages therebetween. The plates are inserted in a floor opening and threaded members projecting from one of the plates are threaded into the other plate to draw the two plates together for compressing the material to seal the periphery of the opening and hold the fitting against movement. Stops on the threaded members prevent excessive pressure from being applied to the material.

It is, therefore, one object of the present invention to provide a more economical fitting assembly for extending separate electrical and communication lines or connections through a floor.

It is another object of the present invention to provide an improved fire resistant fitting assembly for extending separate electrical lines through a floor.

Other objects and features of the present invention will become apparent on the examination of the following specification and claims, together with the drawings.

BRIEF DESCRIPTION OF THE DRAWINGS

FIG. 1 is a side elevational view of a fitting assembly incorporating the principles of the present invention and illustrating an outlet box and a floor in section;

FIG. 2 is a diametrically opposed side elevational view of the fitting assembly shown in FIG. 1;

FIG. 3 is an exploded view of the assembly shown in FIGS. 1 and 2; and

FIG. 4 is a sectional view taken through the outlet box for illustrating the top of the fitting.

DESCRIPTION OF THE PREFERRED EMBODIMENT

In FIGS. 1-3 a fire resistant fitting assembly commonly called a thru-floor fitting indicated generally by the reference character 10 is shown assembled to a floor 12 to extend separate electrical power and communication connections. The connections are established from a position below the floor to a power outlet or receptacle indicated at 13 as indicated by wires 13a and to a communication outlet not shown through a box 14 located above the floor.

The assembly 10 comprises one pair of longitudinally aligned conduits 18 and 20, and a second pair of longitudinally aligned conduits 22 and 24 with conduits 18 and 22 secured adjacent one end in a respective plate or disc 26 and the conduits 20 and 24 secured adjacent one end in a respective plate or disc 28 so as to align the conduit 18 with conduit 20 and conduit 22 with conduit 24. The ends of the conduits are each secured in the respective plate 26 or 28 by a roll-over crimp and a plurality of spaced apart bolts 30 secure the plates to each other with a disc 32 of expandable fire resistant material therebetween to form a sandwich. Another disc 33 of expandable fire resistant material is frictionally or otherwise supported on the conduits in engagement with the lower surface of plate 28.

The disc 32 has spaced passages 34 and 36 therein, as best seen in FIG. 3, to communicate the conduits with respective passages or appertures 38 in the plate 26 and passages or appertures 39 in plate 28. Thus separate through passages are provided for wiring in the conduits 20 and 24, for example, through the conduits 18 and 22 respectively. Suitable spaced passages 40 in the disc 32 aligned with passages 42 in plate 26 receive bolts 30 for threaded engagement with the openings 44 in plates 28.

Disc 33 has openings registering with the conduits and threaded screw ends to receive each.

The material of disc 32 should be of compressible type and one particularly suitable type is a fire resistant material sold by the 3M Company of St. Paul, Minn. under the name of "3M Firestop Material", #FS-195. The disc 32 may actually comprise 3 discs each ¼" in thickness or a single disc of selected thickness and is compressible for the purpose of tightly fitting a passage 46 in the floor 12 and in which the assembly 10 is received. The material of discs 32 and 33 expand on exposure to heat to seal the passages. It will be appreciated that other types of material may be suitable including intumescent fire resistant materials.

The bolts 30 and conduits 18 and 22 extend upwardly from the plates and each bolt 30 has an upwardly extending straight shank portion with a first shoulder 48 thereon seated against the upper surface of the upper plate 26. A reduced diameter portion 50 of each bolt extends through the plate 26 and through passages 42 and 40 in discs 26 and 32 respectively and the threaded end 52 on each bolt threads into a respective threaded opening 44 of a lower plate 28 to sandwich the material of disc 32 therebetween. A second shoulder 54 on each bolt located between shoulder 48 and the threaded portion 52 of each bolt engages the upper surface of plate 28 to act as a stop and provide a predetermined compression to disc 32.

The end of each conduit 18 and 22 opposite plate 26 is secured by a roll crimp to a floor plate 56, which forms the lower wall of outlet box 14. The plate 56 overlaps the passage 46 to close one end of the passage through the floor and a sponge rubber gasket 58 is located between the plate and a floor covering generally provided on the floor. Dimples or projections may be provided in the plate 56 to space the plate slightly from the floor.

The plate 56 is provided with apertures through which the slotted ends of bolts 30 may be manipulated and a peripheral or rim wall 60 to which a housing or shell 62 may be secured to close the box. A barrier wall 64 in the box is spot welded to plate 56 between the openings or passages at which the conduits 18 and 22 are secured to the plate 56 to separate the box into two compartments for receiving power wiring and communication wiring respectively. A trim plate fitting may also be provided under the edges of shell 62 to cover the opening in the floor covering.

The power wiring 13a extends from a position below the floor through conduit 24, the respective paessages of openings 39, 38 and 34 and conduit 22 into one compartment of the outlet box where it may be secured to a receptacle such as 13 in the box wall 62 or otherwise connected to a load. The conduits 24 and 22 may be standard $\frac{3}{4}$" thin wall and the wiring extended to conduit 24 is usually provided from a length of conduit secured to conduit 24 below the floor. The communication wiring also extends from below the floor through 1" standard thin wall conduit 20, the respective passages 39, 38 and 36 and 1" standard thin wall conduit 18 to other of the compartments in box 14 where it may be conveniently connected to a telephone or other apparatus. The larger diameter conduit is generally used for communication wiring since this wiring may include a relatively large cable of wires and may have an attached connector at the end. The securing of the conduits to the respective metal plate 56, 26 and 28 serves to ensure a good ground continuity with the bolts 30 securely connecting the plates.

To assemble the housing in the floor 12, a hole or passage 46 is first formed in the floor to a selected size. The conduits 18 and 22 secured to the floor plate 56 and the disc 26 in turn secured to disc 28 by bolts 30 with the material 32 therebetween. The conduits 20 and 24 are secured to disc 28 with disc 33 fitted over conduits 20 and 24 and the assembly is simply placed within opening 46 until the floor plate 56 engages the sponge rubber gasket on the floor. The length of conduits 18 and 22 determine the location of discs 26 and 28 in the floor and the conduits 20 and 24 project below the floor for access from the space below the floor.

The belts 30 are then operated to further thread into the threaded openings 44 of the lower disc 28. As the threading operation occurs the lower disc 28 is drawn upwards towards the upper disc 26 since the floor plate 56 and disc 26 cannot move downwardly, thereby compressing the material of disc 32 therebetween and expanding the disc against the periphery of the opening 46. The periphery of the disc 32 thereby engages the periphery of the floor opening 46 to tightly secure the assembly in passage 46 and seal the opening in floor 12. Wiring in the conduits may then be connected or if desired drawn through the conduits and passages and then connected. The stops 54 on the bolts prevent excessive compression of the disc 32.

Thereafter, if heated air resulting from combustion or other other problem, should enter passage 46, or the conduits, the material of discs 32 and 33 swells or expands to form a hard cake-like material sealing the passages or openings 34, 36 and 46. The disc material is impervious to most fire temperatures and prevents communication between the conduit passages 38 and 39 in the plates or through the passage 46 to prevent combustion or heated air from passing through the floor opening to the floor above.

Typically the bolts 30 are $2\frac{1}{2}$" long, the space between the plates 56 and 26 substantially 1.8". The plates 26 and 28 have a diameter of 2.96" so that they fit easily in passage 46, which normally is a 3" diameter opening. Conduits 20 and 24 are of convenient lengths which is usually chosen as 8" for conduit 20 and 10" for conduit 24.

In the event it is desired to relocate the wires, the fitting may of course be easily moved after loosening the bolts 30, and the passage 46 filled with a fire resistant fitting such as shown in a copending application filed simultaneously herewith by Chapman et al.

The foregoing constitutes a description of an improved floor fitting whose inventive concepts are believed set forth in the accompanying claims.

What we claim is:

1. An electrical fitting assembly for insertion in a floor passage extending through a floor, the improvement comprising:

a pair of plates, each plate having a periphery shaped and dimensioned to be received in said floor passage, each plate also having an aperture adapted to receive a conduit;

a first conduit received within said aperture in a first of said plates and secured to said first plate, said first conduit extending in an opposite direction from the second of said plates;

a second conduit received within said aperture of said second plate and secured to said second plate, said second conduit extending in an opposite direction from said first plate, said first conduit aligned with said second conduit;

a compressible material located between said plates in a plane between said first and second conduits, said material having a passage therein aligned with said conduits to enable the extension of wiring through said first and second conduits, said material adapted to expand inwardly about the entire perimeter of said passage upon exposure to sufficient heat in order to completely seal said passage about a wire extending therethrough;

means extending through said first plate and engaged in said second plate for connecting said first plate to said second plate and for readily moving said second plate towards said first plate upon installation of said assembly to compress said material and expand said material radially outward for sealing the periphery of said passage in said floor, whereby said assembly is secured in said floor passage; and a third plate having an aperture therein receiving said first conduit extending from said first plate and secured to said first conduit with said third plate having a perimeter larger than said passage through said floor for overlapping said passage.

2. The assembly claimed in claim 1 in which said means for securing comprises a plurality of spaced bolts parallel to said conduits each extending through said first plate and through said material with each bolt having a first shoulder engaged with one surface of said first plate to prevent movement of said first plate axially in one direction relative to said bolt.

3. The assembly claimed in claim 2 in which each bolt has a threaded end threadingly received by said second plate and a stop shoulder located intermediate said plates to limit the compression of said material in response to the threading of each bolt in said second plate to move said second plate toward said first plate.

4. The assembly claimed in claim 3 in which said third plate has a plurality of spaced openings therein each aligned with a respective one of said bolts.

5. The assembly claimed in claim 4 in which said floor passage has a nominal diameter of 3" and said material has a nominal diameter before compression of 2.96".

6. An electrical fitting assembly for insertion in a floor passage extending through a floor, the improvement comprising:

a first plate having a first pair of conduit receiving apertures therein;

a second plate having a second pair of conduit receiving apertures therein, said first and said second plates having a periphery shaped and dimensioned to be received in said passage;

a first pair of tubular conduits respectively secured in said first pair of apertures and extending from said first plate in a first direction away from said second plate;

a second pair of tubular conduits respectively secured in said second pair of apertures and extending from said second plate in a second direction away from said first plate, a first conduit of said first pair of conduits aligned with a first conduit of said second pair of conduits and forming a first set of conduits, the second conduit of said first pair of conduits aligned with the second conduit of said second pair of conduits and forming a second set of conduits;

a compressible fire resistant material adapted to expand on exposure to heat to seal the space between the plates, said material being located between said plates and also in a plane between said first and second pairs of conduits, said material having a pair of spaced passages therein with the spaced passages aligned respectively with the first set of conduits and the second set of conduits to provide an extension passage for the extension of power line through the first set of conduits and communication line through the second set of conduits, whereby the extension passages are sealed by the radially inward expansion of said material upon exposure to heat;

a threaded member extending through the first plate and engaged in the second plate for connecting the first plate to the second plate and for moving said second plate towards said first plate to compress said material between said plates, expand said material radially outward and seal the periphery of the material to the walls of the passage in the floor; and a third plate having a pair of spaced apertures therein respectively receiving said first and second conduits of said first pair of conduits, said third plate having a perimeter larger than said passage through said floor for overlapping said passage.

7. In the assembly claimed in claim 6, a housing secured to said third plate; a wall secured to said third plate between the passages in said third plate and separating said housing into separate compartments, each compartment communicating separately with the conduits secured to said third plate.

8. In the fitting assembly claimed in claim 6, means on said threaded member for limiting the pressure expansion of said material, and means in said third plate for enabling manipulation of said threaded member for securing said assembly in said floor passage.

9. The fitting assembly claimed in claim 6, in which said threaded member provides ground continuity between said first and second plates and said first pair of conduits provide ground continuity between said first plate and said third plate.

10. The assembly as claimed in claim 1 or 6, wherein said conduits are secured within said apertures by a roll-over crimp on each of said conduits.

* * * * *